(12) United States Patent
Kraus

(10) Patent No.: US 10,445,412 B1
(45) Date of Patent: Oct. 15, 2019

(54) DYNAMIC BROWSING DISPLAYS

(71) Applicant: Amazon Technologies, Inc., Seattle, WA (US)

(72) Inventor: Holger Kraus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 15/272,143

(22) Filed: Sep. 21, 2016

(51) Int. Cl.
*G06F 17/22* (2006.01)
*G06F 3/0346* (2013.01)
*G06F 17/21* (2006.01)

(52) U.S. Cl.
CPC ........ *G06F 17/2247* (2013.01); *G06F 3/0346* (2013.01); *G06F 17/212* (2013.01)

(58) Field of Classification Search
CPC ................ G06F 17/2247; G06F 3/0346
See application file for complete search history.

(56) References Cited

U.S. PATENT DOCUMENTS

| 6,857,102 | B1* | 2/2005 | Bickmore | G06F 17/2247 707/E17.121 |
| 9,727,293 | B1* | 8/2017 | White | G06F 17/30905 |
| 2004/0103371 | A1* | 5/2004 | Chen | G06F 17/30905 715/205 |
| 2006/0195252 | A1* | 8/2006 | Orr | G01C 21/36 701/433 |
| 2007/0206221 | A1* | 9/2007 | Wyler | G06F 17/30905 358/1.15 |
| 2009/0044126 | A1* | 2/2009 | Wyler | G06F 16/9577 715/734 |
| 2012/0079033 | A1* | 3/2012 | Vuong | G06Q 10/107 709/206 |
| 2013/0275889 | A1* | 10/2013 | O'Brien-Strain | G06Q 30/0269 715/760 |
| 2013/0283148 | A1* | 10/2013 | Lim | G06F 17/2247 715/234 |
| 2015/0066665 | A1* | 3/2015 | Long | G06Q 30/0277 705/14.73 |
| 2015/0067596 | A1* | 3/2015 | Brown | G06F 3/0416 715/808 |
| 2015/0169430 | A1* | 6/2015 | Deng | G06F 11/3676 717/124 |
| 2015/0205473 | A1* | 7/2015 | Weber | G06F 3/0485 715/830 |
| 2015/0356195 | A1* | 12/2015 | Kilzer | G06F 16/74 715/234 |
| 2017/0075547 | A1* | 3/2017 | MacLean | G06F 17/30905 |
| 2017/0154266 | A1* | 6/2017 | Schultz | G06F 17/2247 |

\* cited by examiner

*Primary Examiner* — Ryan F Pitaro
(74) *Attorney, Agent, or Firm* — Knobbe Martens Olson & Bear, LLP

(57) ABSTRACT

Systems and methods for the presentation content on client computing devices. A processing component inspects browse render tree elements to detect the aspects of browser content and replace those aspects with a visual cue. This allows the page to utilize the available display space for the dynamic aspects of the browser content. In response to an input from the mobile device, the browser can provide the previously static aspects of the browser content.

21 Claims, 12 Drawing Sheets

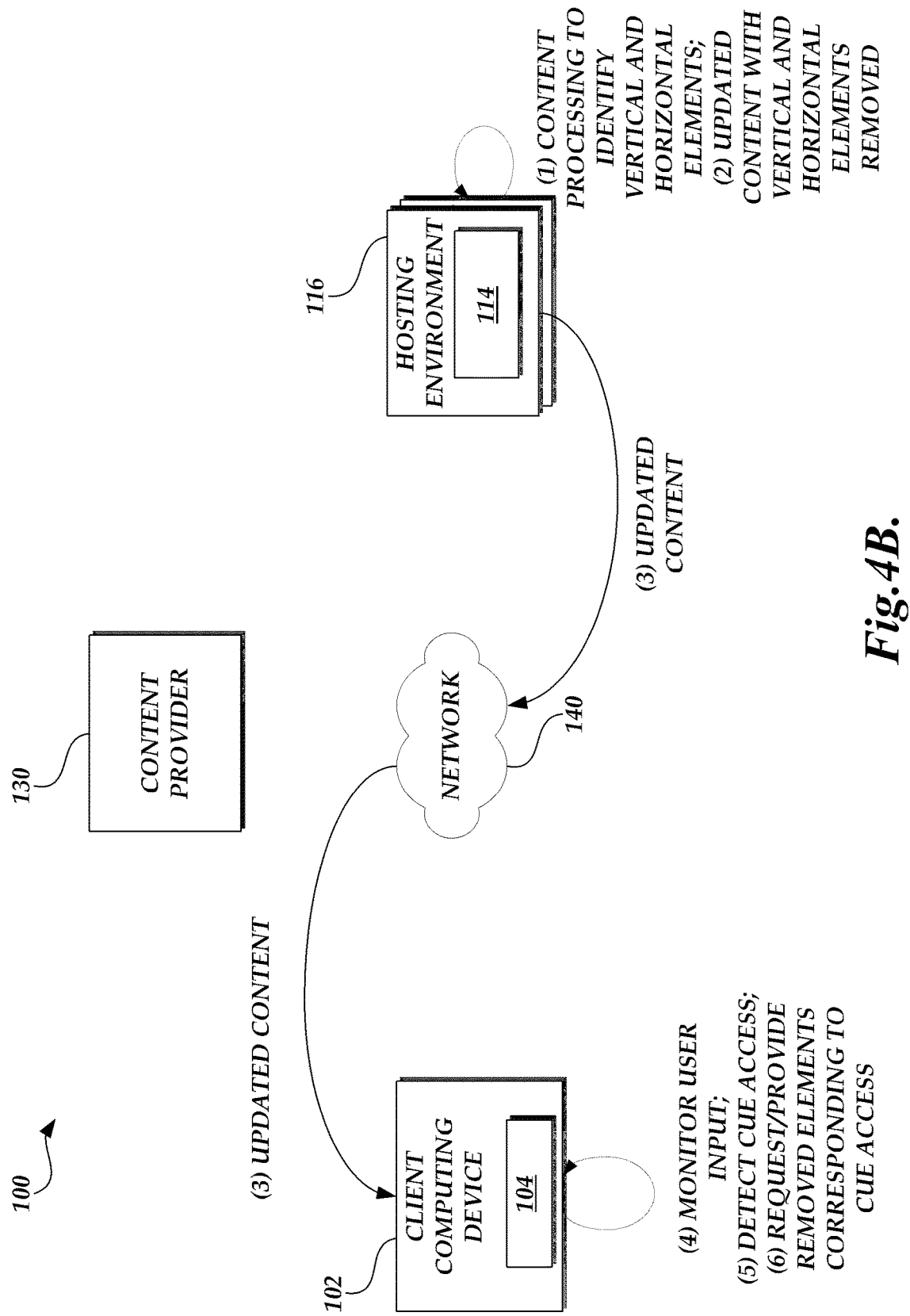

DYNAMIC BROWSING DISPLAYS

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, client computing devices may have more limited computing resources to host applications and render content to be displayed to the user. In some implementations, content providers can offer customized content, e.g., a mobile version of the content, that attempts to provide a reduced set of content or otherwise includes formatting that may be better suited for client computing devices having relatively smaller display screens for presenting content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 4A and 4B are block diagrams of the logical network of FIG. 1 illustrating the requesting and processing content in accordance with the present application;

DETAILED DESCRIPTION

Figure 1:
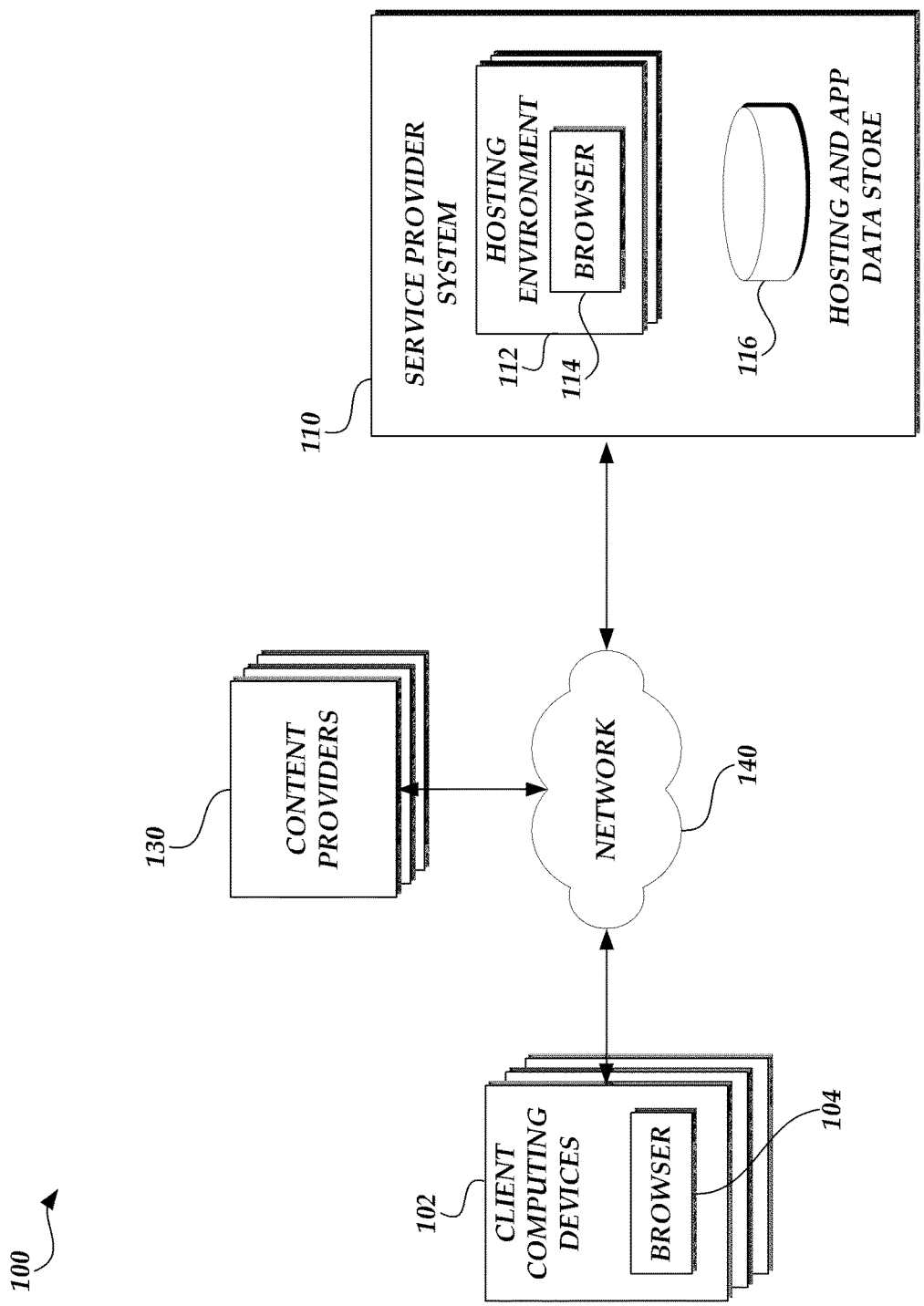
FIG. 1 is a block diagram depicting an illustrative logical network including multiple client computing devices, content providers and a service provider network.

Generally described, the present application corresponds to management of content to be displayed on client computing devices. More specifically, aspects of the present application relate to the processing of content to be rendered on client computing devices. Illustratively, a client computing device can utilize a browser application or browsing application functionality to access content provided by content providers via a communication network. At least some of the client computing devices, such as mobile devices, have limited display capabilities that limit the amount of content displayed within a browsing application or as part of the browsing functionality. With regard to the browser content that is rendered on the display, portions of the browser content to be displayed can be characterized as static content relating to menus, branding/graphics, or template information common to multiple pages of browser content. Other portions of the browser content to be displayed can be characterized as dynamic content that is most likely specific content for the particular page of content.

Illustratively, a browser application can include a processing component or processing functionality that can inspect display objects, such as browse render tree elements, to detect the static aspects of browser content and replace the static aspects with a visual cue. In one example, the processing component can inspect the display objects to determine display objects that are either substantially vertical display objects at an edge of the browser content or substantially horizontal display objects at an edge of the browser content. Based on inspecting the display characteristics of the static display objects, the processing component can replace the static portions of the browser content with a visual cue that is displayed in lieu of the static portion but suggests to a user that additional content is available. Illustratively, the visual cues can indicate a direction of tilt or movement for the device, such as an arrow. Additionally, replacing the static portions of the browser content allows the browser to utilize the available display space for the dynamic aspects of the browser content.

Many computing devices, such as mobile devices also include various input devices, such as accelerometers, that users are accustomed to using to cause changes in the operation of the mobile device. Accordingly, in a further aspect, in response receiving accelerometer input from a user in a direction indicated by one of the visual cues, the browser can identify one or more of the visual cues that correspond to the accelerometer input, e.g., a direction of tilt of the device in the direction indicated by the visual cue. The processing component can then update the content by restoring the previously hidden static aspects of the browser content. By utilizing accelerometer input, or similar inputs, the browser content can maintain other user input functionality such as touch screen functionality (e.g., pinching, zooming, swiping, selecting content) separate from the control of the display of the static and dynamic browser content.

Although aspects of some embodiments described in the disclosure will focus, for the purpose of illustration, on the illustrative interactions for requesting browser content and illustrative screen displays, one skilled in the relevant art will appreciate that the examples are illustrative only and are not intended to be limiting. More specifically, although aspects of the present application will be described with regard to a render tree, render tree elements, display objects, a domain object model tree or domain object model tree elements, one skilled in the relevant art will appreciate that a description of any methodology identified any specific type of object or element may also be applied to different types of objects or elements and the illustrative descriptions should not be limited solely to the discussed object or element.

FIG. 1 is a block diagram depicting an illustrative logical network 100 including multiple client computing devices 102, multiple content providers 130 and a service provider network 110 in communication via a network 140. While the client computing devices 102 are shown as a group within FIG. 1, the client computing devices 102 may be geographically distant, and independently owned or operated. For example, the client computing devices 102 could represent a multitude of users in various global, continental, or regional locations accessing the service provider system 110. Accordingly, the groupings of client computing devices 102 within FIG. 1 is intended to represent a logical, rather than physical, grouping. Similarly, while one set of illustrative components is shown to represent the service provider system 110, multiple instances of each component may be present within the content management system 110, and such components may be located within geographically diverse areas (e.g., globally, continentally, or regionally), in order to provide a wide geographical presence for the content management system 110.

Network 140 may be any wired network, wireless network, or combination thereof. In addition, the network 120 may be a personal area network, local area network, wide area network, cable network, satellite network, cellular telephone network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and the service provider system 110 is depicted as having a single connection to the network 140, individual components of the client computing devices 102, content providers 130 and service provider system 110 may be connected to the network 140 at disparate points.

Client computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include one or more data stores (not shown in FIG. 1) including various applications or computer-executable instructions, such as web browsers 104, used to implement the embodiments disclosed herein.

In accordance with embodiments, the service provider system 110 includes a set of hosting environments, illustrated in FIG. 1 as hosting environment 112. As described in further detail below, the hosting environment 112 can host a browser application 114 for interaction with a corresponding browser application 104 instantiated on the client computing device 102. In some embodiments, the service provider system 110 can also include a hosting and app data store 116 for maintaining preference information for processing the browser content or to retain information created in the generated of updated content. It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting environment 112 and browser application 114 may be executed by one more virtual machines implemented in a hosted computing environment. Additionally, hosting and app data store 116 may correspond to multiple physical or virtual computing resources that may logically represented as a single component, but may be implement in a distributed manner.

Figure 2:
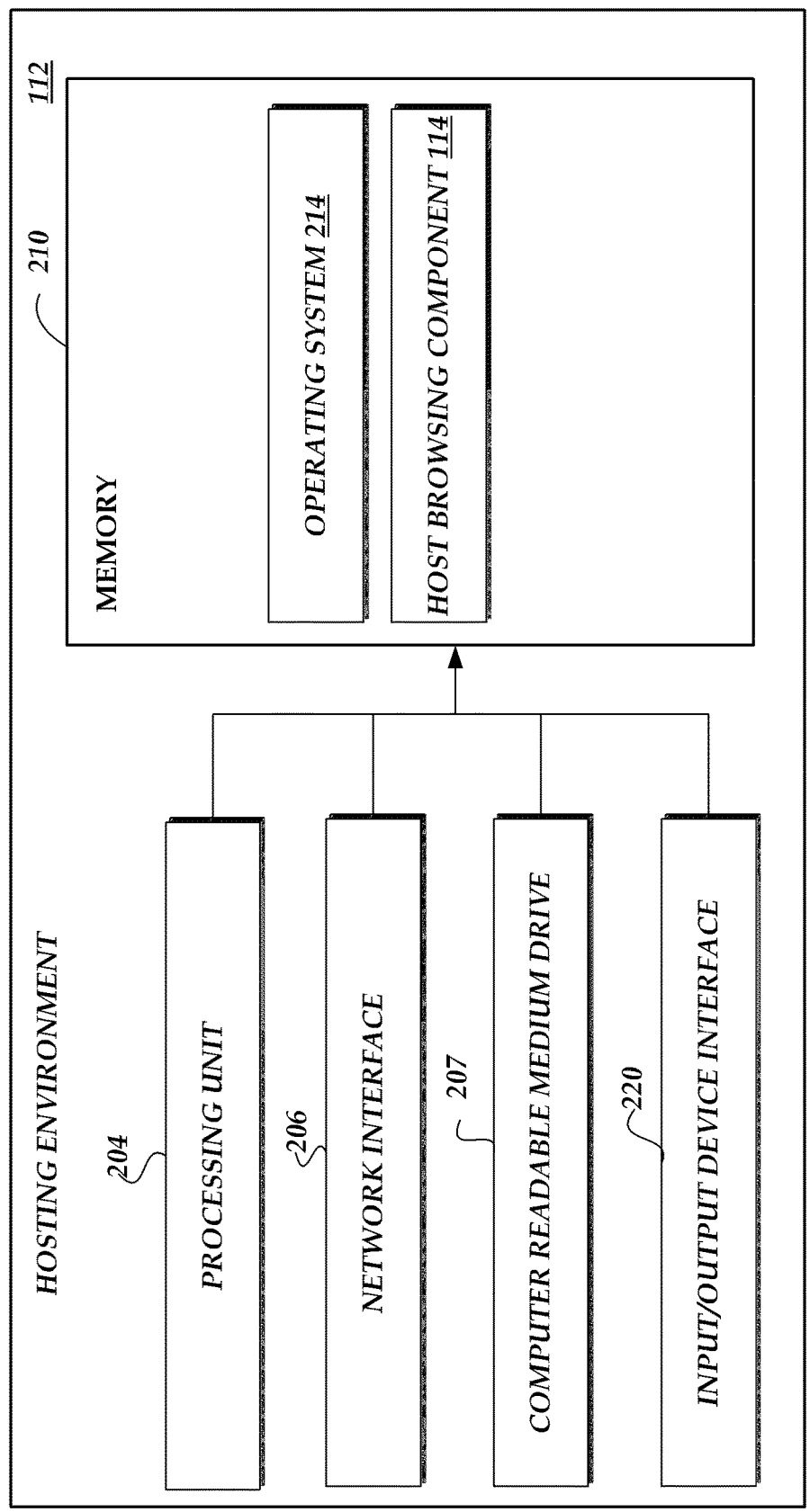
FIG. 2 is a block diagram of illustrative components of a hosting environment for hosting applications in accordance with the present application.

FIG. 2 depicts one embodiment of an architecture of an illustrative of hosting environment, such as hosting environment 112 that host virtualized applications, such as browser application 114 in accordance with the present application. The general architecture of the hosting environment depicted in FIG. 2 includes an arrangement of computer hardware and software components that may be used to implement aspects of the present disclosure. As illustrated, the hosting environment includes a processing unit 204, a network interface 206, a computer readable medium drive 207, an input/output device interface 220, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes a host browsing component 114 that can interface with a corresponding browsing component on the client computing device 102. Additionally, in some embodiments, the host browsing component 114, or network-based browsing component, can further implement one or more aspects of the functionality attributable to the browsing component 104 of the client computing device 102. Accordingly, one skilled in the relevant art will appreciate that the host browsing component 114 can implement all or portions of the functionality described with regard to the function of the browsing component 104 of the client computing device 102.

Figure 3:
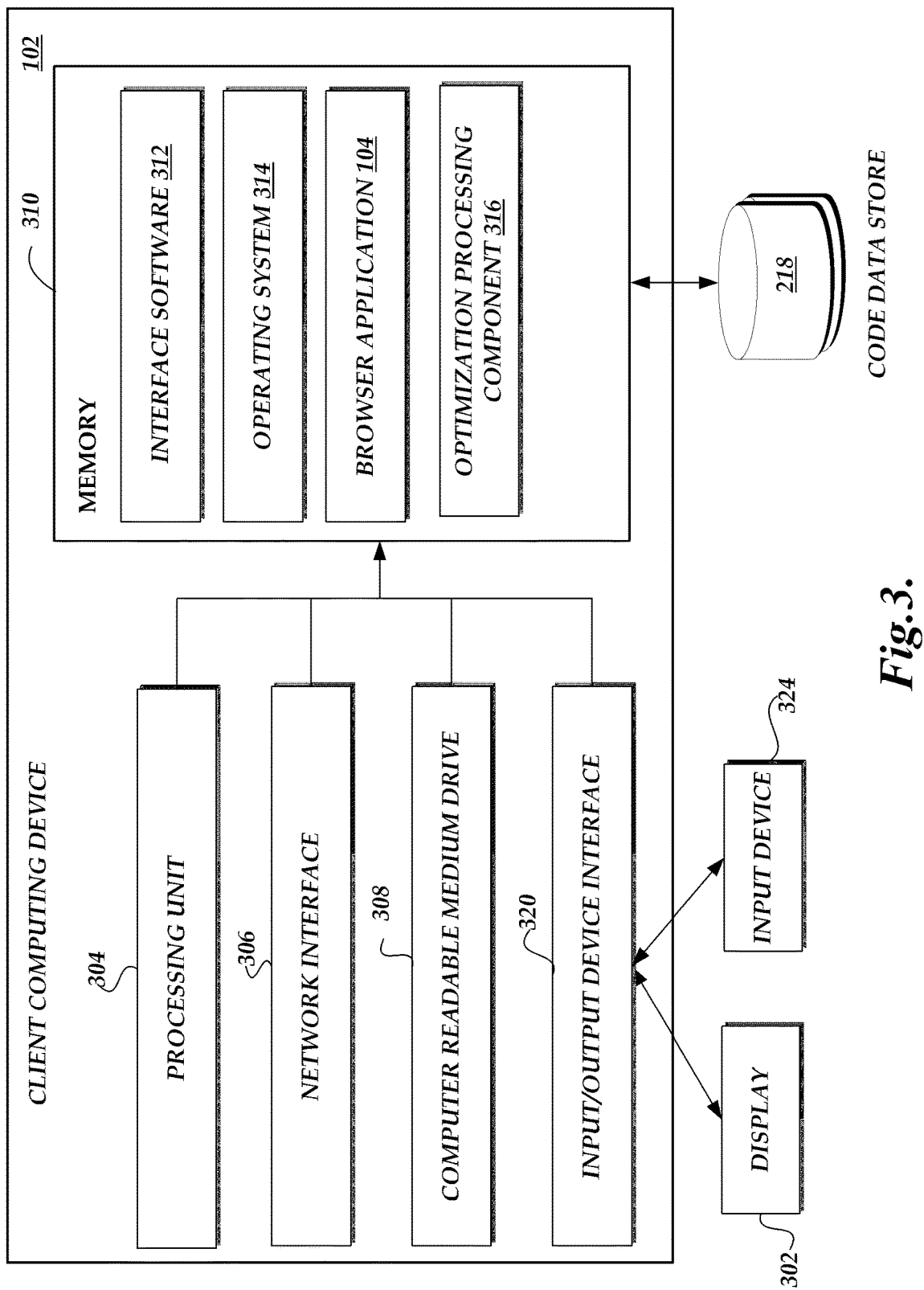
FIG. 3 is a block diagram of illustrative components of a client computing device for processing content in accordance with the present application.

FIG. 3 depicts one embodiment of an architecture of an illustrative a client computing device 102 that can generate and process browser content in accordance with the present application. The general architecture of the client computing device 102 depicted in FIG. 3 includes an arrangement of computer hardware and software components that may be used to implement aspects of the present disclosure. As illustrated, the management component 112 includes a processing unit 304, a network interface 306, a computer readable medium drive 307, an input/output device interface 230, an optional display 302, and an input device 324, all of which may communicate with one another by way of a communication bus.

The network interface 306 may provide connectivity to one or more networks or computing systems, such as the network 130 of FIG. 1. The processing unit 304 may thus receive information and instructions from other computing systems or services via a network. The processing unit 304 may also communicate to and from memory 310 and further provide output information for an optional display 302 via the input/output device interface 330. The input/output device interface 320 may also accept input from the input device 324, such as a keyboard, mouse, digital pen, etc. Additionally, as will be described in greater detail below, the input device 324 can include one or more inputs from components that are operable to indicate movement, tilt, or orientation of the client computing device 102, such as accelerometers, tilt sensors, and the like. The inputs to the client computing device 102 may be internal to the device, such as contained within a housing, or external to the device and connected via a wired or wireless interface.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 104. The memory 310 may further include computer program instructions and other information for implementing aspects of the present disclosure. For example, in one embodiment, the memory 310 includes a browser application 102 for accessing content and communicating with and processing information from one or more content providers 120. Additionally, for purposes of illustration, the browsing component 104 can interface with an optimization processing component 316 for generating updated browser content. Although illustrated as separate components, the browser application 104 and the optimization processing component 316 may be integrated all or in part. The client computing device 102 can also include a code data store 218 for maintaining preference information for processing the browser content or to retain information created in the generated of updated content.

Figure 4A:
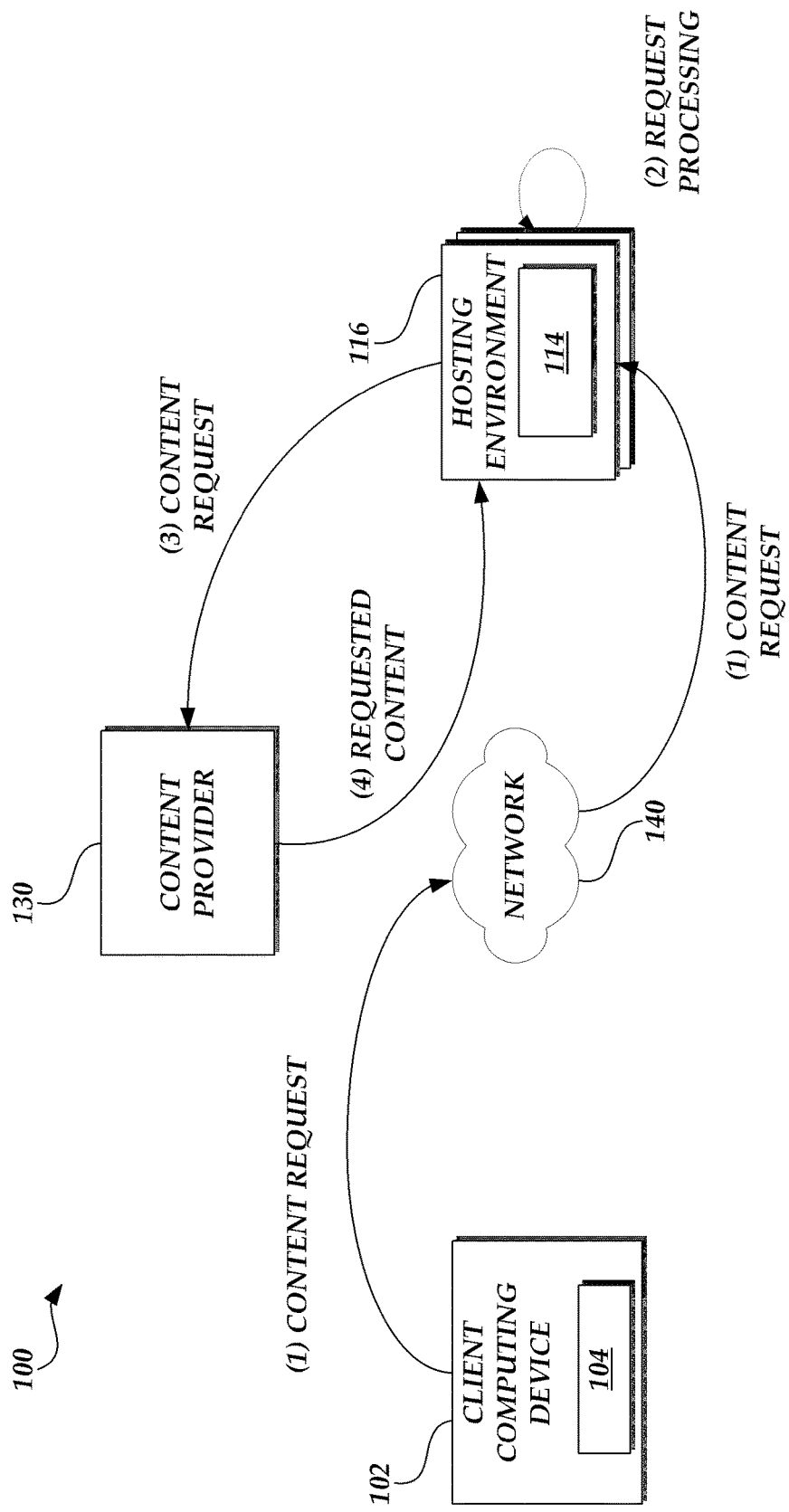
Figure 5A:
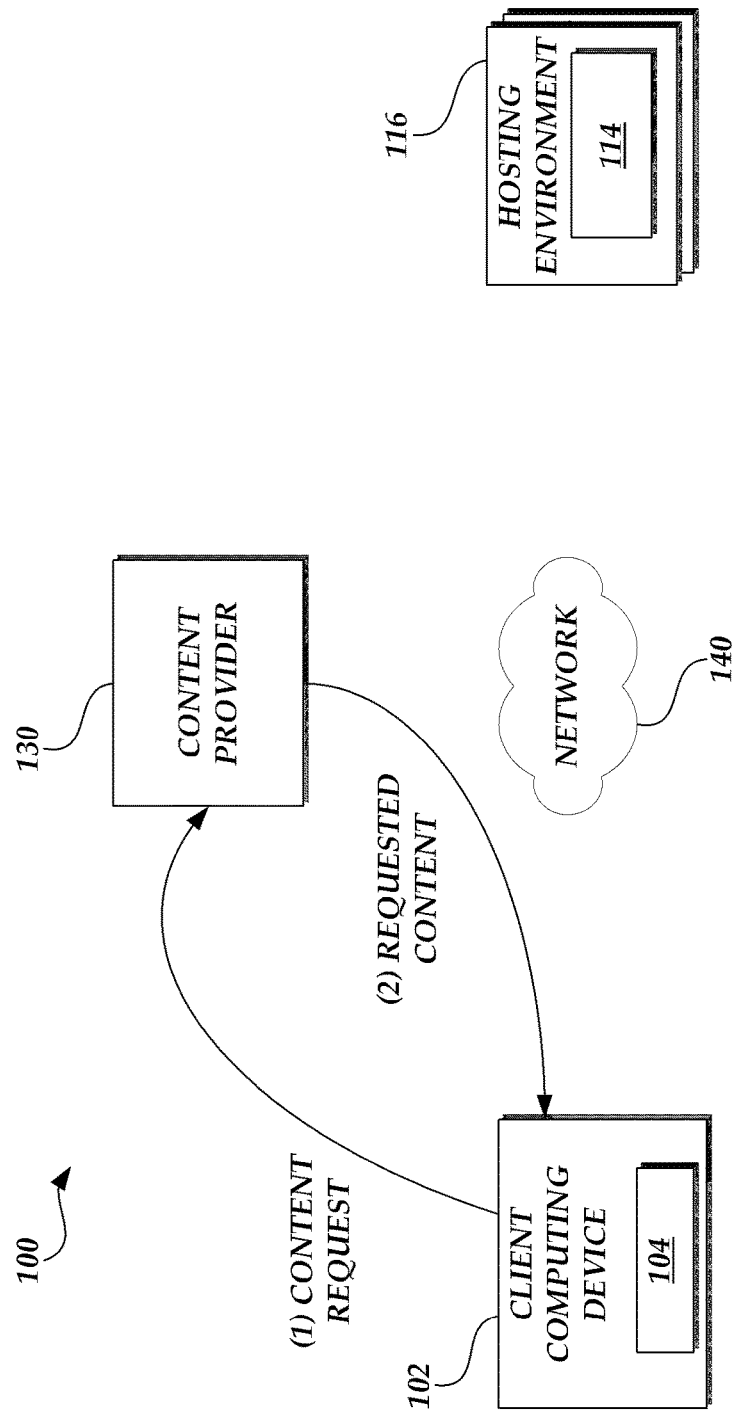
FIGS. 5A and 5B are block diagrams of the logical network of FIG. 1 illustrating the processing of requesting and processing content in accordance with the present application.
Figure 5B:
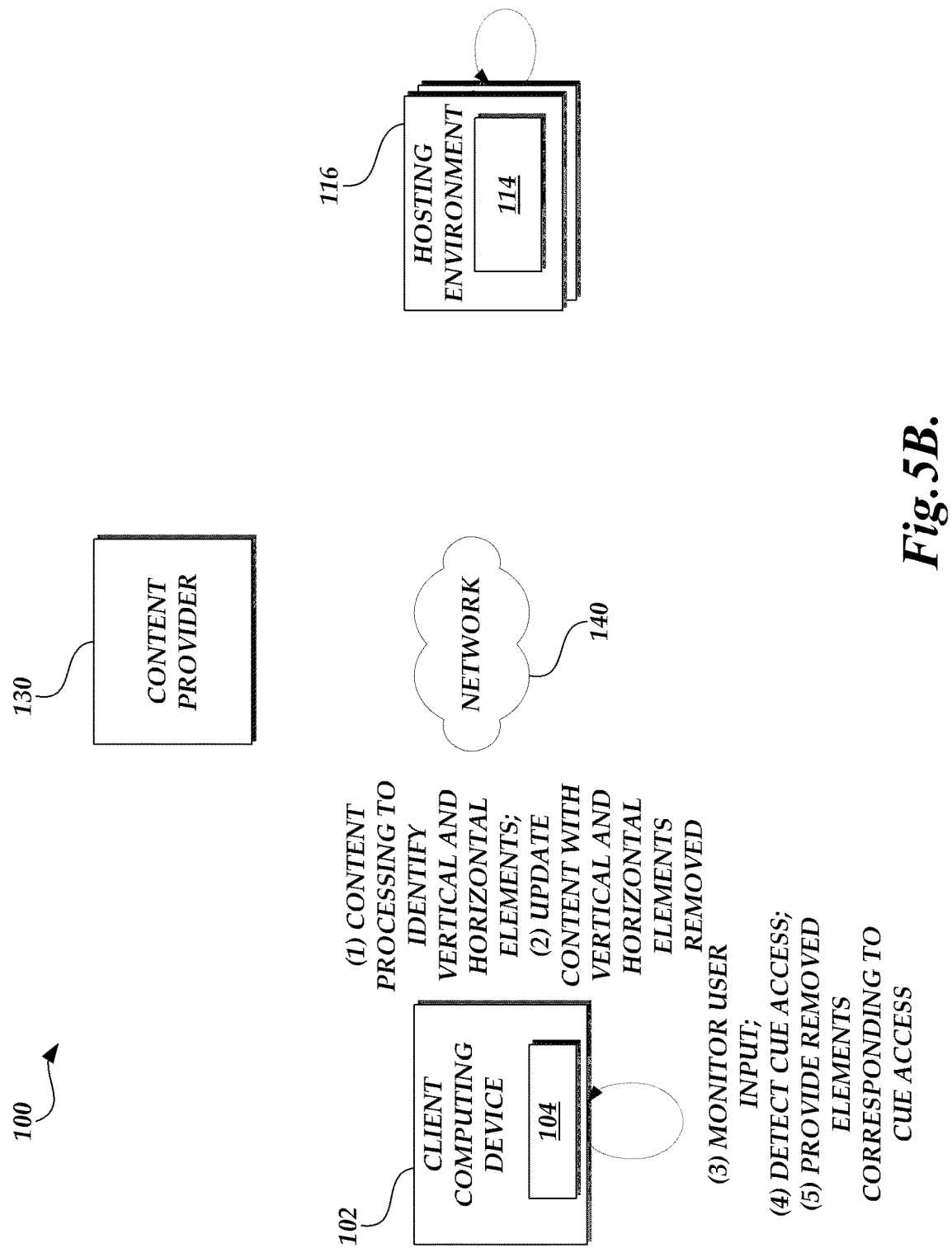

Turning now to FIGS. 4A, 4B, 5A, and 5B illustrative interactions between the components of the logical network 100 in processing requests for browser content will be described. More specifically, FIGS. 4A and 4B will illustrate the processing of browser content with regards to cooperation between the client computing device browser component 104 and the network-based browsing component 114. FIGS. 5A and 5B will illustrate an alternative embodiment in which the client computing device browser component 104 interacts directly with the content providers 120.

With reference to FIG. 4A, at (1), the client computing device 102 transmits a request to the service provider 110 that is received at the network based browser 114. Illustratively, a user can initiate the request by selecting content from the instantiated browser application 102, via of many possible interfaces. Although illustrated as a single request, the browser component 104 and browser component 114 can exchange multiple communications, including for purposes of authentication and for establishing how the two browsers will process content. More specifically, the two browser applications 104 and 114 may establish a browser configuration that for purposes of the present application can establish whether the browser component 114 will process received content prior to transmitting to the browser component 104 or whether the browser component 114 will send unprocessed content to the browser component 104, which can then further process the content. For purposes of the illustration of FIGS. 4A and 4B, it will be assumed that the browser component 114 of the host environment 112 will process at least a portion of the content.

At (2), the browser component 114 processes the request. In one aspect, the browser component 114 can function as a proxy application and forward the request from the browser component 104 to the content provider 130. In another aspect, the browser component 114 transmits an independent request for content to the content provider 130. In this embodiment, the browser component 114 can utilize additional or alternative information as part of the request, such as profile information specified by the service provider and networking information completely independent of the client computing device 102. At (3), the browser component 114 transmits the content request to the content provider 130 for processing. At (4), the content provider 130 provides the requested again. Although illustrated as a single request, the browser component browser component 114 and content provider 130 can exchange multiple communications, including for purposes of authentication and security for obtaining the requested content. Additionally, as will be described in detail below, the content provider 130 can either provide an original version of the requested content or content optimized for mobile devices.

With reference to FIG. 4B, in this embodiment, the browser component 114 will process the content to replace one or more portions of the static content. At (1), the browser component 114 processes the content to identify elements that may correspond to vertical elements or horizontal elements indicative of, or characteristic of, static content. One skilled in the relevant art will appreciate that content to be generated on a display can be provided to a browser application from a content provider 130 in the form of markup language, e.g., HTML, and display information, e.g., cascading style sheets ("CSS"). To process the content, the browser application 114 parses the HTML and CSS information to create a set of tree structures of elements, referred to as a domain object model ("DOM") tree and CSSOM tree. The browser component 114 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface.

Illustratively, the browser component 114 can utilize one or more methods to identify the render tree elements (DOM tree elements or display objects) that are likely to correspond to vertical or horizontal elements. In a first aspect, the vertical elements can share the characteristic that the height of the vertical element is likely to correspond to the height of the page to be displayed and to be located approximate to the edge of the page. In another aspect, the horizontal elements can share the characteristic that the width of the horizontal element is likely to correspond to the width of the page to be displayed and to be located approximate to the edge of the page. In accordance with the first aspect, the browser component 114 can obtain information regarding the length and width of the render tree elements (or a portion of thereof). Additionally, the browser component 114 can determine from the render tree which of the render tree elements correspond to an edge of the content to be displayed. Utilizing at least these two characteristics, it can be assumed that a vertical element having a height substantially the height of the content (or some specified threshold) and corresponding to an edge is more likely to be static content portion and can be replaced with a visual indicator to create additional space for the dynamic content portion of the content. Similarly, it can be assumed that a horizontal element having a width substantially the width of the content (or some specified threshold) and corresponding to an edge is also more likely to be static content portion and can be replaced with a visual indicator to create additional space for the dynamic content portion of the content. One illustrative routine for determining vertical and horizontal elements will be described with regard to FIGS. 6-8.

In a second aspect, the vertical and horizontal elements can share a characteristic that pixel colors of the static portions are likely to contrast with the pixel color of the elements displaying the dynamic content. For example, as a matter of design choice, pixel colors for static portions, such as menu, bars, etc. may be of a darker color than pixel color of content to be presented to a user. In another example, pixel colors utilized static portions of a specified content provider 130 may correspond to a specific color palette associated with branding by the particular content provider. In still a further example, a service provider may obtain usage information (such as user input data or specific user feedback) that identifies static portions and dynamic portions and associates pixel colors based on the determination. Accordingly, a render tree element located at an edge of the content having a specific pixel color from other render tree elements is most likely to correspond to a static portion of content and be identified as a vertical or horizontal element (or element to be replaced).

In one embodiment, the browser component 114 can identify all render tree elements on an edge and conduct a pixel color comparison between the edge render tree elements and adjacent tree elements. The browser component 114 can determine an absolute pixel color difference and compare the difference to a pixel color difference threshold. If the determined difference exceeds the threshold, the browser component 114 can label the edge tree element as a vertical or horizontal render tree element. If the determined difference does not exceed the threshold, the browser component 114 may not be able to determine the render tree element as a vertical or horizontal render tree element.

In a second embodiment, the browser component 114 can identify all render tree elements on an edge and conduct a pixel color search to identify render tree elements having a color substantially similar to colors known to correspond to static portions of content. As discussed above, the browser component 114 can illustratively obtain such pixel color information from the content providers 130 or based on usage information. The browser component 114 can then identify vertical or horizontal render tree elements having a substantially similar color.

At (2), the browser component 114 can replace one or more render tree elements identified as a vertical element or a horizontal element with visual cue. As previously described, in accordance with the present application, the visual cue will provide an indication of a tilt or movement of the computing device 102 that will cause the device to display "hidden" content (e.g., the replaced content). As will be described below, an exemplary visual cue can be an arrow. In some embodiments, the browser component 114 can replace all identified vertical and horizontal elements. In other embodiments, the browser component 114 can selectively replace a subset of vertical or horizontal elements based on preference information. In one example, the preference information can be specified by a user. In another example, the preference information can be specified by the content provider. The preference information can include priority information for replacing vertical elements or horizontal elements or logic rules indicating how much of the render tree elements should be replaced (e.g., utilizing a zoom level to determine a percentage of render tree elements that should be replaced).

To replace the identifier render tree elements, the browser component 114 can maintain render tree elements that corresponds to the visual cue elements. Examples include render tree elements that correspond to a left portion of the content, render tree elements that correspond to a right portion of the content, render tree elements that correspond to a top portion of the content and render tree elements that correspond to a bottom portion of the content. Once the set of render tree elements are identified as vertical elements or horizontal elements, the browser component 114 replaces the identified horizontal elements with either a top visual cue render element or a bottom visual cue render element depending on the respective location of the identified horizontal element in the render tree. Illustratively, the top visual cue render elements and bottom visual cue render elements may include a graphic pointing upward or downward to elicit tilt in that respective direction. In some embodiments, the top and bottom visual cue render elements may correspond to a common graphic (e.g., all up, all down, or a combined up and down) such that a tilt in that direction would correspond to multiple visual cue elements (e.g., a single tilt may cause both the top and bottom elements to be selected). Alternatively, the top and bottom may correspond to opposite graphic (e.g., up and down) to allow for selective control for the user. Additionally, the browser component 114 replaces the identified vertical elements with either a left visual cue render element or a right visual cue render element depending on the respective location of the identified vertical element in the render tree. Illustratively, the left visual cue render elements and right visual cue render elements may include a graphic pointing left or right to elicit tilt in that respective direction. In some embodiments, the left and right may correspond to opposite graphic (e.g., left and right arrows) to allow for selective control for the user. Alternatively, the left and right visual cue render elements may have a common graphic (e.g., all left, all right or a combined left and right arrow) such that a tilt in one direction would correspond to multiple visual cue elements (e.g., a single tilt may cause both the left and right elements to be selected).

At (3), the browser component 114 forms the updated content (e.g., with the visual cues) and transmits the updated content to the browser component 104 for rendering. Illustratively, the replacement of the render tree elements will cause the render tree elements corresponding to dynamic portions of the content to be of a greater size in the rendered display. Accordingly, to form the updated content the browser component 114 may reprocess the render tree (or DOM tree or display objects) with the replaced render tree elements to allow for the resizing or adjustment of the remaining render tree elements and incorporation of the new render tree elements. In some embodiments, the removed render tree elements may be transmitted with the updated content. In other embodiments, the browser component 114 may only transmit the removed elements upon request. As will be explained in detail below, upon select input from a user, the browser component 114 can update the content again by restoring one or more the render tree elements that we had been previously removed.

After rendering, at (4), the browser component 104 monitors for user inputs related to an orientation or tilt of the device (or change thereof). Illustratively, the client computing device 102 can utilize the input from one or more accelerometer to determine orientation or tilt. If such user input is detected at (5), the browser component can associate the tilt input with one or more of the visual cues at (6). Illustratively, the browser component can then request or provide the removed render tree elements and generated updated content with the restored render tree elements. Illustratively, the restoration of the render tree elements will cause the render tree elements corresponding to dynamic portions of the content to be of a smaller size in the rendered display. Accordingly, to form the updated content (or second updated content) the browser component 114 may reprocess the render tree (or DOM tree or display objects) with one or more of the restored render tree elements to allow for the resizing or adjustment of the remaining render tree elements and incorporation of the new render tree elements. As previously described, the local browser component 104 may already have the hidden display elements or request the elements from the browser component 114. The process can be repeated. Additionally, in some embodiments, the user can utilize the same controls to re-hide the static portions.

With reference to FIG. 5A, illustrative interaction for an alternative embodiment will be described. At (1), the client computing device 102 transmits a request directly to the content provider 130 without interaction with the browser component 114. Illustratively, a user can initiate the request by selecting content from the instantiated browser application 102, via of many possible interfaces. At (2), the content provider 130 provides the requested again. Although illustrated as a single request, the browser component 104 and content provider 130 can exchange multiple communications, including for purposes of authentication and security for obtaining the requested content. Additionally, as will be described in detail below, the content provider 130 can either provide an original version of the requested content or content optimized for mobile devices.

With reference to FIG. 5B, in this embodiment, the browser component 104 will process the content to replace one or more portions of the static content. At (1), the browser component 104 processes the content to identify elements that may correspond to vertical elements or horizontal elements indicative of, or characteristic of, static content. One skilled in the relevant art will appreciate that content to be generated on a display can be provided to a browser application from a content provider 130 in the form of markup language, e.g., HTML, and display information, e.g., cascading style sheets ("CSS"). To process the content, the browser application 104 parses the HTML and CSS information to create a set of tree structures of elements, referred to as a domain object model ("DOM") tree and CSSOM tree. The browser component 104 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface.

Illustratively, the browser component 104 can utilize one or more methods to identify the render tree elements that are likely to correspond to vertical or horizontal elements. In one aspect, the vertical elements can share the characteristic that the height of the vertical element is likely to correspond to the height of the page to be displayed and to be located approximate to the edge of the page. In another aspect, the horizontal elements can share the characteristic that the width of the horizontal element is likely to correspond to the width of the page to be displayed and to be located approximate to the edge of the page. In a separate aspect, the vertical and horizontal elements can share a characteristic that the pixel color of the static portions are likely to contrast with the pixel color of the elements displaying the dynamic content. Accordingly, a continuous edge display having a contrasted color from the center elements is most likely to correspond to a bar or a menu based on common design implementations. One illustrative routine for determining vertical and horizontal elements will be described with regard to FIGS. 6-8.

At (2), the browser component 104 can replace one or more render tree elements identified as a vertical element or a horizontal element with visual cue. As previously described, in accordance with the present application, the visual cue will provide an indication of a tilt or movement of the computing device 102 that will cause the device to display "hidden" content (e.g., the replaced content). As will be described below, an exemplary visual cue can be an arrow. In some embodiments, the browser component 104 can replace all identified vertical and horizontal elements. In other embodiments, the browser component 104 browser component 114 can selectively replace a subset of vertical or horizontal elements based on preference information. In one example, the preference information can be specified by a user. In another example, the preference information can be specified by the content provider. The preference information can include priority information for replacing vertical elements or horizontal elements or logic rules indicating how much of the render tree elements should be replaced (e.g., utilizing a zoom level to determine a percentage of render tree elements that should be replaced).

At (3), the browser component 104 forms the updated content (e.g., with the visual cues) and transmits the updated content to the browser component 104 for rendering. After rendering, at (4), the browser component 104 monitors for user inputs related to an orientation or tilt of the device (or change thereof). Illustratively, the client computing device 102 can utilize the input from one or more accelerometer to determine orientation or tilt. If such user input is detected at (5), the browser component can associate the tilt input with one or more of the visual cues at (6). Illustratively, the browser component can request or provide the removed elements and generated updated content with the restored display elements. The process can be repeated. Additionally, in some embodiments, the user can utilize the same controls to re-hide the static portions.

Figure 6:
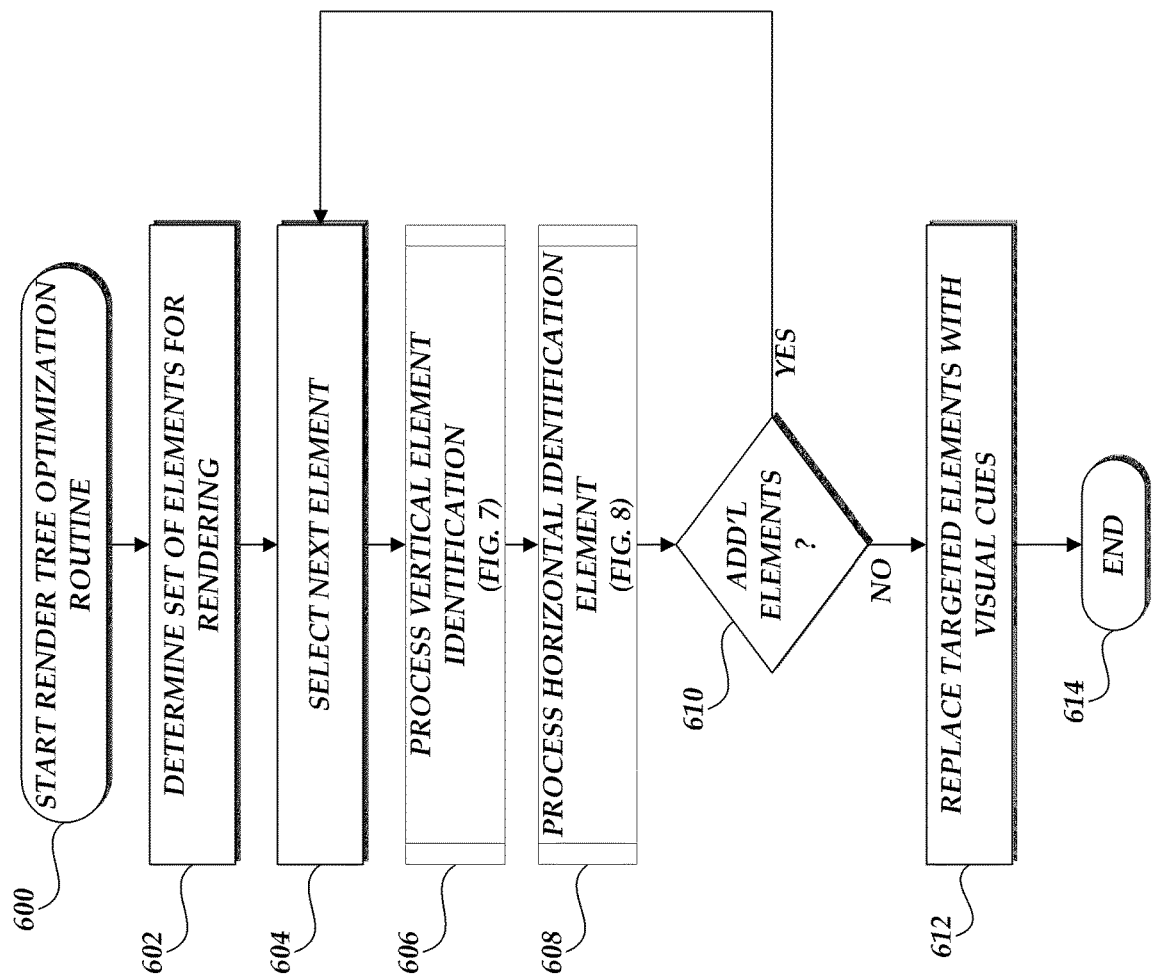
FIG. 6 is a flow diagram illustrative of a render tree processing routine implemented by a computing device in accordance with the present application.

FIG. 6 is a flow diagram illustrative of a render tree processing routine 600 implemented by a computing device in accordance with the present application. As previously described with regard to FIGS. 4A and 5A, either the browser component 114 or browser component 104 obtains content from the content provider 130. Accordingly, routine 600 will be described generally with regard to implementation by a browser application. At block 602, the browser component determines a set of elements for rendering. As previously described, one skilled in the relevant art will appreciate that content to be generated on a display can be provided to a browser application from a content provider 130 in the form of markup language, e.g., HTML, and display information, e.g., cascading style sheets ("CSS"). To process the content, the browser application 114 parses the HTML and CSS information to create a set of tree structures of elements, referred to as a domain object model ("DOM") tree and CSSOM tree. The browser component 114 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface.

Illustratively, the browser component processes the content to identify render tree elements that may correspond to vertical elements or horizontal elements indicative of, or characteristic of, static content. Illustratively, the browser component 114 can utilize one or more methods to identify the render tree elements that are likely to correspond to vertical or horizontal elements. At block 604, the routine 600 enters into a loop to process all the display elements by selecting the next element. At block 606, the browser processes the set of elements to identify horizontal elements. Illustratively, the horizontal elements can share the characteristic that the width of the horizontal element is likely to correspond to the width of the page to be displayed and to be located approximate to the edge of the page. An illustrative sub-routine 700 for determining horizontal elements will be described below. However, as previously described, there may be alternative methodologies to identify horizontal elements, including the utilization of pixel color analysis. Accordingly, in this alternative embodiment, the horizontal elements can share the characteristic of having an pixel color difference relative to adjacent render tree elements exceeding a threshold or being associated with a pixel color known (or assumed) to correspond to a horizontal render tree element.

Figure 7:
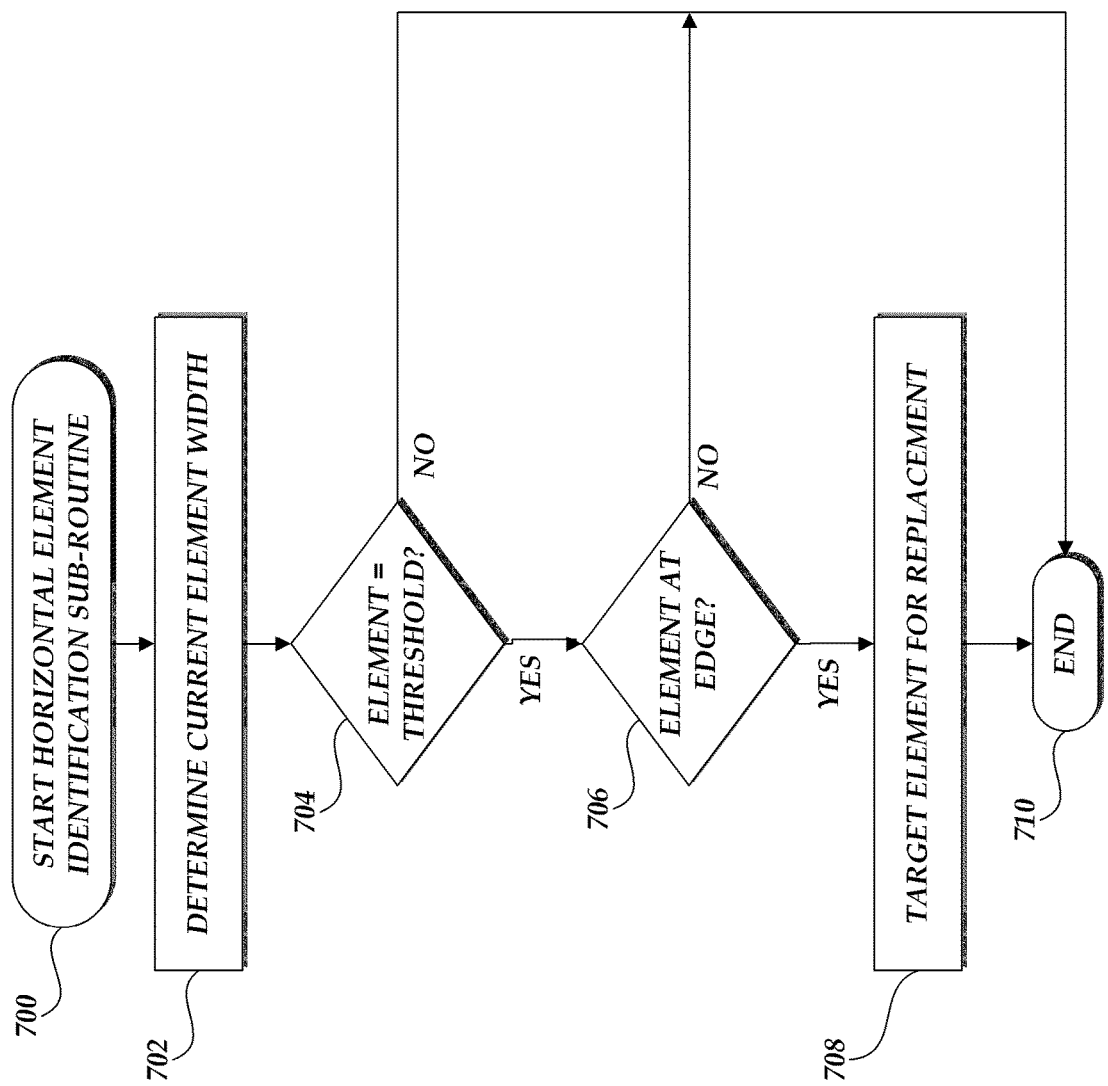
FIG. 7 is a flow diagram illustrative of a horizontal element identification sub-routine implemented by a computing device in accordance with the present application.

Turning to FIG. 7, at block 702, the browser component determines the current element width. At decision block 704, the browser determines whether the element width corresponds to a threshold width. Illustratively, the threshold width can correspond to substantially the width of the page to be rendered. If it is determined that the current element width is not above the threshold, the browser can determine that the element is not likely static content and the subroutine 700 returns at block 710. Alternatively, at decision block 704, if the browser determines that the current element width is above the threshold, at decision block 706, a test is conducted to determine whether the element corresponds to an edge element. If it is determined that the element is not at the edge, the browser can determine that the element is not likely static content and the subroutine 700 returns at block 710. Alternatively, if the browser determines that the element is an edge, at block 708, the browser can designate the target for replacement at block 708. At block 710, the sub-routine returns.

Returning to FIG. 6, at block 608, the browser processes the set of elements to identify vertical elements. Illustratively, the vertical elements can share the characteristic that the height of the vertical element is likely to correspond to the height of the page to be displayed and to be located approximate to the edge of the page. An illustrative sub-routine 800 for determining vertical elements will be described below. However, as previously described, there may be alternative methodologies to identify vertical elements, including the utilization of pixel color analysis. Accordingly, in this alternative embodiment, the vertical elements can share the characteristic of having an pixel color difference relative to adjacent render tree elements exceeding a threshold or being associated with a pixel color known (or assumed) to correspond to a horizontal render tree element. In some embodiments, the thresholds or known pixel colors may be different for the vertical and horizontal render tree elements.

Figure 8:
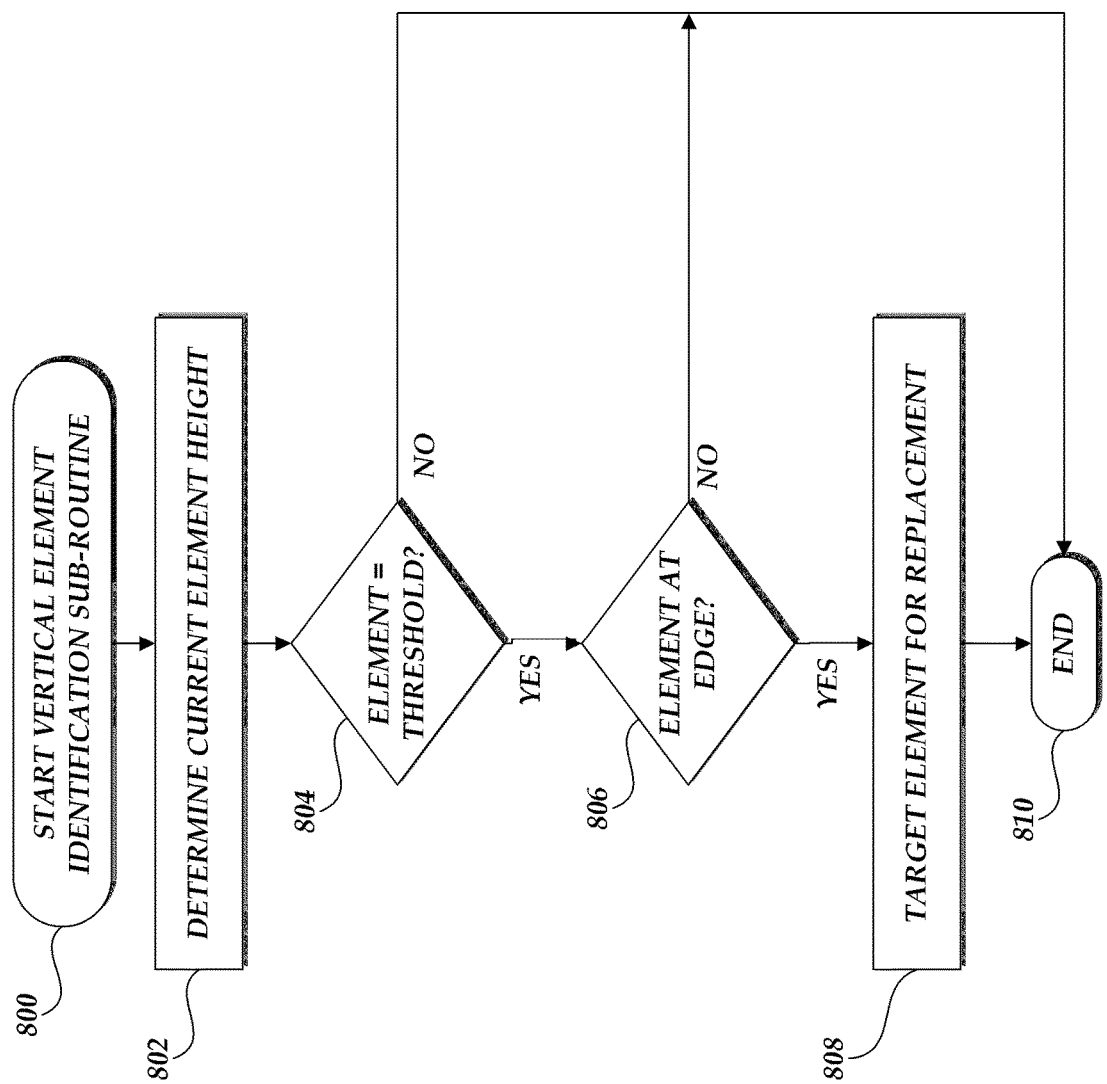
FIG. 8 is a flow diagram illustrative of a vertical element identification sub-routine implemented by a computing device in accordance with the present application.

Turning to FIG. 8, at block 802, the browser component determines the current element height. At decision block 804, the browser determines whether the element height corresponds to a threshold height. Illustratively, the threshold height can correspond to substantially the height of the page to be rendered. If it is determined that the current element height is not above the threshold, the browser can determine that the element is not likely static content and the subroutine 800 returns at block 810. Alternatively, at decision block 804, if the browser determines that the current element height is above the threshold, at decision block 806, a test is conducted to determine whether the element corresponds to an edge element. If it is determined that the element is not at the edge, the browser can determine that the element is not likely static content and the subroutine 800 returns at block 810. Alternatively, if the browser determines that the element is an edge, at block 808, the browser can designate the target for replacement at block 808. At block 810, the sub-routine returns.

Returning to FIG. 6, at decision block 610, a test conducted to determine whether additional elements should be processed. If so, the routine 600 returns to block 604 to process the next element in the set of elements.

If no additional elements exist at decision block 610, at block 612, the browser replaces one or more identified as a vertical element or a horizontal element with visual cue. As previously described, in accordance with the present application, the visual cue will provide an indication of a tilt or movement of the computing device 102 that will cause the device to display "hidden" content (e.g., the replaced content). Illustratively, the replacement of the render tree elements will cause the render tree elements corresponding to dynamic portions of the content to be of a greater size in the rendered display. Accordingly, to form the updated content the browser component 114 may reprocess or create a new render tree (or DOM tree or display objects) with the replaced render tree elements to allow for the resizing or adjustment of the remaining render tree elements and incorporation of the new render tree elements.

As will be described below, an exemplary visual cue can be an arrow that suggests a path of movement or tilt to access content not currently rendered on the display screen. In some embodiments, the browser component 114 can replace all identified vertical and horizontal elements. In other embodiments, the browser component 114 browser component 114 can selectively replace a subset of vertical or horizontal elements based on preference information. In one example, the preference information can be specified by a user. In this embodiment, the browser component 114 can maintain local preference information that provides the preference information for identifying or replacing vertical and horizontal elements. In another example, the browser component 114 can utilize various interfaces to request the preference information from a service. The preference information can also include performance information provided by the client computing device, such as screen size, processing resources, zoom levels, touch sensitivity, accelerometer sensitivity that can affect which content is replaced. For example, the browser component 114 may implement logic rules to replace all identified render tree elements if a zoom level is above 100 percent. In another example, the browser component 114 may implement logic rules to replace only vertical render tree elements if the accelerometer sensors are configured such that only a left or right tilt input is enabled. One skilled in the relevant art will appreciate that additional or alternative examples or processing rules could also be applied.

In another example, the preference information can be specified by the content provider. The preference information may be included in the transmitted content, such as meta-data or obtained utilizing the interfaces to request the preference information. The preference information can include priority information for replacing vertical elements or horizontal elements or logic rules indicating how much of the render tree elements should be replaced (e.g., utilizing a zoom level to determine a percentage of render tree elements that should be replaced). At block 614, the routine 600 terminates.

Figure 9:
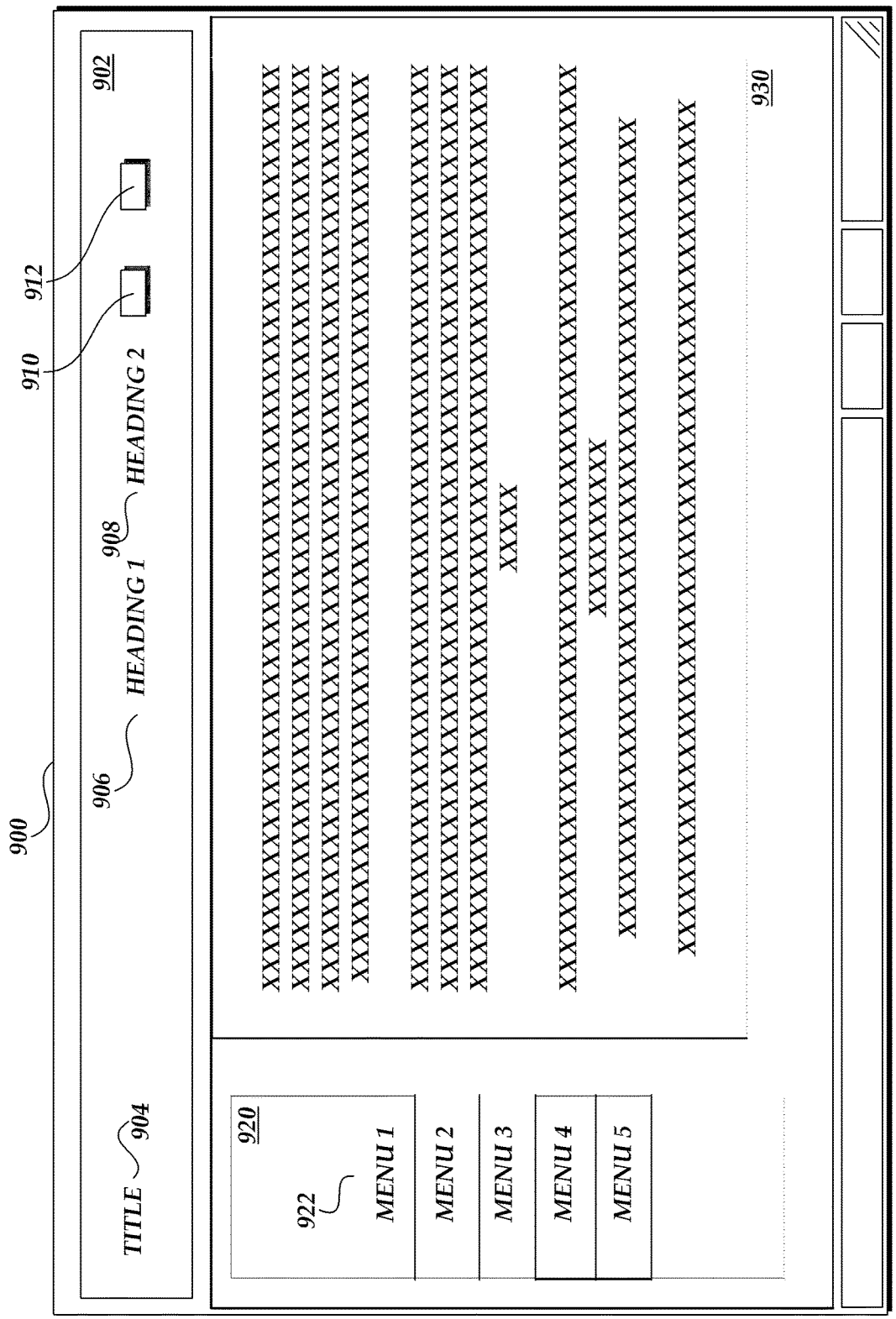
FIG. 9 is a block diagram illustrative of a screen display generated by a computing device in accordance with the present application.
Figure 10:
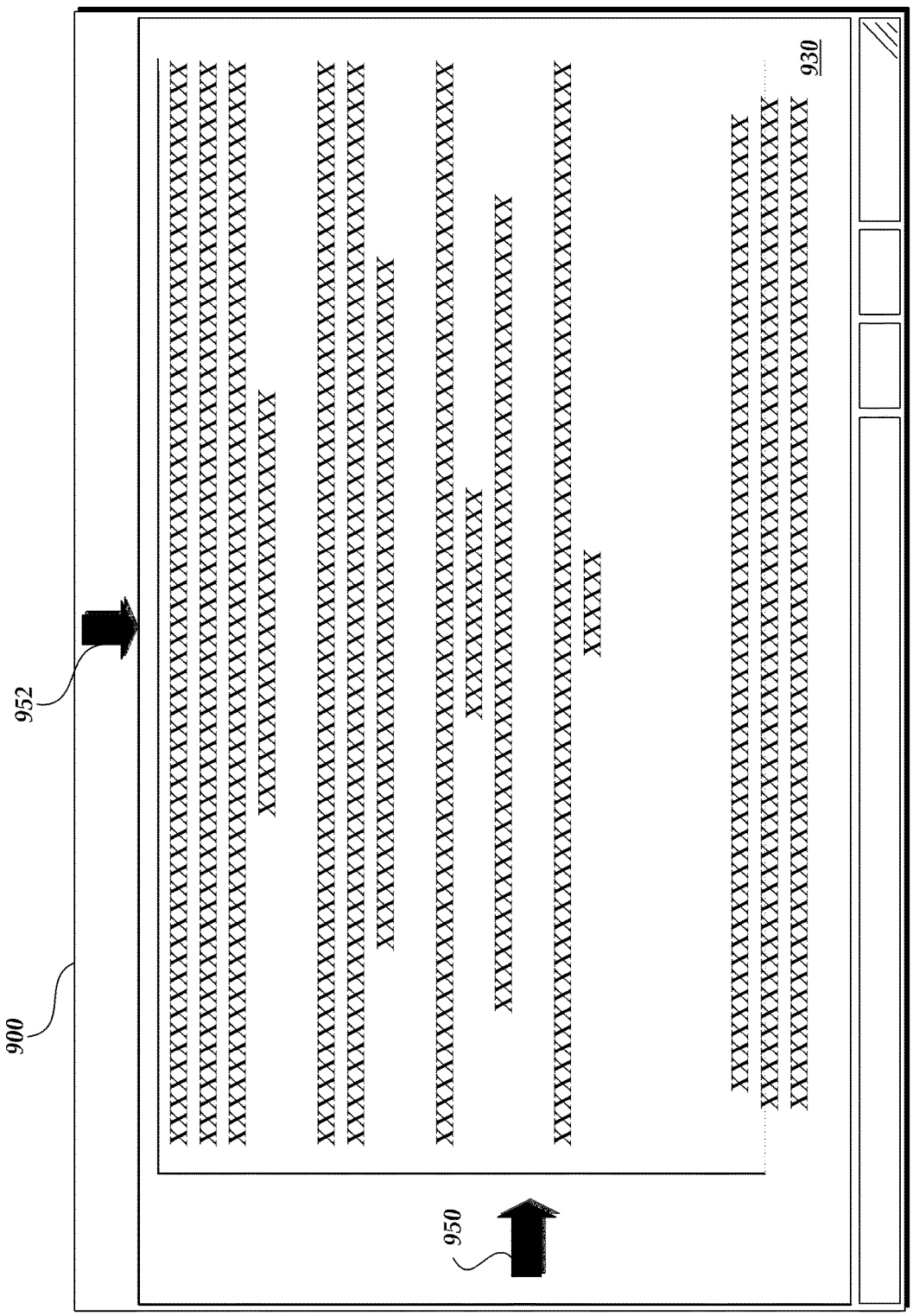
FIG. 10 is a block diagram illustrative of a screen display generated by a computing device in accordance with the present application.

Turning to FIGS. 9 and 10, an illustrative screen display illustrating the processing of content will be described. With regard to FIG. 9, an illustrative screen display 900 includes two static content portions 902 and 904. Static content portion 902 includes a number of display elements 904, 906, 908, 910, and 912. Static portion 902 can correspond to a horizontal element. Static portion 920 includes menu controls 922. Static portion 920 can correspond to a vertical element. The screen display 900 can further include a dynamic portion 930 for display content. Turning to FIG. 10, after processing, static portion 902 can be replaced with visual cue 952. Additionally, static portion 920 can be replaced with visual cue 950. Each visual cue 950, 952 can correspond to a direction of movement or tilt that will cause the respective static portion 902, 920 to be restored.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for generating content for display on a client computing device comprising:
   obtaining browser content to be displayed on the client computing device;
   processing the browser content to generate a set of render tree elements corresponding to content to be rendered on the client computing device;
   processing the set of render tree elements to identify first individual render tree elements having a width substantially the same as a width of the content to be displayed;
   characterizing the first individual render tree elements as horizontal elements to be displayed as edges of content;
   processing the set of render tree elements to identify second individual render tree elements having a height substantially the same as height of the content to be displayed;
   characterizing the second individual render tree elements as vertical elements to be displayed as edges of content;
   replacing at least one of the horizontal elements to be displayed as edges of content or at least one of the vertical elements to be displayed as edges of content with at least one individual visual cue to generate updated content to be rendered on the client computing device;
   obtaining an accelerometer input from the client computing device indicative of tilt of the client computing device in a direction;
   identifying at least one individual visual cue associated with the accelerometer input; and
   replacing the identified at least one individual visual cue with the horizontal element or the vertical element associated with the at least one individual visual cue.

2. The method as recited in claim 1 wherein the visual cue corresponds to an arrow indicating a direction of tilt.

3. The method as recited in claim 1, wherein replacing at least one horizontal element or at least one vertical element with an individual visual cue to generate updated content to be rendered on the client computing device includes replacing all identified horizontal elements and all identified vertical elements with an individual visual cue to generate updated content to be rendered on the client computing device.

4. The method as recited in claim 1 further comprising obtaining preference information for replacing horizontal or vertical elements, wherein replacing at least one horizontal element or at least one vertical element with an individual visual cue to generate updated content to be rendered on the client computing device includes replacing at least one horizontal element or at least one vertical element with an individual visual cue to generate updated content to be rendered on the client computing device based on the preference information.

5. The method as recited in claim 1 further comprising:
   obtaining a request for content from a browser application on the client computing device;
   transmitting an independent request for content to a content provider; and
   transmitting the updated content to be rendered on the client computing device.

6. The method as recited in claim 1 further comprising rendering on the client computing device the updated browser content, subsequent to replacing at least one of the horizontal elements to be displayed as edges of content or at least one of the vertical elements to be displayed as edges of content with at least one individual visual cue to generate updated content to be rendered on the client computing device.

7. A system for managing applications executing on a client computing device comprising:
   a computing device, having a processor and a memory that execute computer-readable instructions for implementing a browser application, the browser application operable to:
      obtain browser content to be displayed on a client computing device display;
      process the browser content to generate a set of display objects corresponding to content to be rendered on the client computing device;
      process the set of display objects to identify individual display objects corresponding to edges of the browser content based on visual characteristics of the individual display objects;
      replace at least one identified individual display object corresponding to an edge of the browser content with individual visual cues to generate updated content to be rendered on the client computing device;
      obtain one or more inputs from the client computing device indicative of tilt of the client computing device in a direction;
      identify at least one individual visual cue associated with the one or more inputs; and
      restore the replaced individual display object associated with the identified visual cue based at least in part on the one or more inputs.

8. The system as recited in claim 7, wherein the display objects include render tree elements.

9. The system as recited in claim 7, wherein the browser application processes the set of display objects to identify individual display objects corresponding to edges of the browser content based on visual characteristics of the individual display objects by processing the set of display objects to identify individual display objects having a width exceeding a threshold width, wherein the identified display objects are horizontal elements to be displayed as edges of the browser content.

10. The system as recited in claim 9, wherein the threshold width corresponds to substantially a width of the content to be rendered on the client computing device.

11. The system as recited in claim 7, wherein the browser application processes the set of display objects to identify individual display objects corresponding to edges of the browser content based on visual characteristics of the individual display objects by processing the set of display objects to identify individual display objects having a height exceeding a threshold height, wherein the identified display objects are vertical elements to be displayed as edges of the browser content.

12. The system as recited in claim 11, wherein the threshold height corresponds to substantially a height of the content to be rendered on the client computing device.

13. The system as recited in claim 7, wherein the browser application replaces all the identified individual display objects with individual visual cues to generate updated content to be rendered on the client computing device.

14. The system as recited in claim 7, wherein the browser application replaces a subset of the identified individual display objects with individual visual cues to generate updated content to be rendered on the client computing device.

15. The system as recited in claim 14, wherein the browser application selects the subset of the identified individual display objects based on preference information.

16. The system as recited in claim 15, wherein the browser application obtains the preference information from at least one of a user or a content provider.

17. The system as recited in claim 7, wherein the browser application:
   obtains a request for content from a browser application on the client computing device;
   transmits an independent request for content to a content provider; and
   transmits the updated content to be rendered on the client computing device.

18. A method for client requests for managing the display of content on a browser application comprising:
   processing browser content to generate a set of domain object elements corresponding to content to be rendered on the client computing device;
   processing the set of domain object elements to identify individual domain object elements corresponding to edges of the browser content based on visual characteristics of the individual domain object elements;
   replacing at least one identified individual domain object element corresponding to edges of the browser content with individual visual cues to generate updated content to be rendered on the client computing device;
   obtaining one or more inputs from the client computing device indicative of tilt of the client computing device in a direction;
   identifying at least one individual visual cue associated with the one or more inputs; and
   processing the set of domain object elements to restore the replaced individual domain object element associated with the identified visual cue.

19. The method as recited in claim 18, wherein processing the set of domain object elements to identify individual domain object elements corresponding to edges of the browser content based on visual characteristics of the individual domain object elements includes processing the set of domain object elements to identify individual domain object elements having a width exceeding a threshold width, wherein the identified domain objects are horizontal elements to be displayed as edges of the browser content.

20. The method as recited in claim 18, wherein processing the set of domain object elements to identify individual domain object elements corresponding to edges of the browser content based on visual characteristics of the individual domain object elements includes processing the set of domain object elements to identify individual domain object elements having a height exceeding a threshold height, wherein the identified domain objects are vertical elements to be displayed as edges of the browser content.

21. The method as recited in claim 18, replacing at least one identified individual domain object element with individual visual cues to generate updated content to be rendered on the client computing device includes replacing all the identified individual domain object elements with individual visual cues to generate updated content to be rendered on the client computing device.

\* \* \* \* \*